(12) United States Patent
Tagge et al.

(10) Patent No.: US 10,683,215 B2
(45) Date of Patent: Jun. 16, 2020

(54) HYDROCARBON-CONTAMINATION TREATMENT UNIT

(71) Applicant: HALLIBURTON ENERGY SERVICES, INC., Houston, TX (US)

(72) Inventors: Michael Tagge, Bogata (CO); Kevin Redfern, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/557,763

(22) PCT Filed: May 7, 2015

(86) PCT No.: PCT/US2015/029640
§ 371 (c)(1),
(2) Date: Sep. 12, 2017

(87) PCT Pub. No.: WO2016/178687
PCT Pub. Date: Nov. 10, 2016

(65) Prior Publication Data
US 2018/0072589 A1 Mar. 15, 2018

(51) Int. Cl.
*C02F 1/28* (2006.01)
*E21B 43/34* (2006.01)
(Continued)

(52) U.S. Cl.
CPC .............. *C02F 1/28* (2013.01); *B01D 15/00* (2013.01); *B01J 20/24* (2013.01); *B01J 20/261* (2013.01);
(Continued)

(58) Field of Classification Search
CPC ........ C02F 1/28; B01J 20/28033; B01J 20/24; B01J 20/261; B01J 20/28023; B01D 15/00; E21B 21/068; E21B 43/34
See application file for complete search history.

(56) References Cited

U.S. PATENT DOCUMENTS 3,616,399 A * 10/1971 Smith .................... C10G 33/06
208/188
4,302,337 A * 11/1981 Larson ............... B01D 17/0202
210/287
(Continued)

FOREIGN PATENT DOCUMENTS

CN 101857285 A * 10/2010
GB 2245609 A * 1/1992 ................ E03F 5/16
(Continued)

OTHER PUBLICATIONS

Halliburton, Baroid, Barasorb, Brine Conditioner Product Data Sheet, Mar. 25, 2010.
(Continued)

*Primary Examiner* — Chester T Barry
(74) *Attorney, Agent, or Firm* — Polsinelli PC

(57) ABSTRACT

A treatment unit includes at least one treatment tank, an intake pump in fluidic communication with the at least one treatment tank via an inlet valve, an output pump in fluidic communication with the at least one treatment tank via a discharge valve, and at least one treatment basket defining a cavity. The at least one treatment basket is removably attached to the at least one treatment tank, and the at least one treatment basket is located above the inlet valve and below the discharge valve. The treatment unit also includes an electrical control panel configured to operate at least one of the intake pump, the inlet valve, the output pump, and the discharge valve. The treatment unit also includes a differential pressure sensor sensing a pressure difference across the at least one treatment basket.

16 Claims, 6 Drawing Sheets

(51) Int. Cl.
*E21B 21/06* (2006.01)
*B01D 15/00* (2006.01)
*B01J 20/24* (2006.01)
*B01J 20/26* (2006.01)
*B01J 20/28* (2006.01)
*C02F 101/32* (2006.01)
*C02F 103/10* (2006.01)

(52) U.S. Cl.
CPC ... *B01J 20/28023* (2013.01); *B01J 20/28033* (2013.01); *E21B 21/068* (2013.01); *E21B 43/34* (2013.01); *C02F 2101/32* (2013.01); *C02F 2103/10* (2013.01); *C02F 2201/005* (2013.01); *C02F 2209/03* (2013.01)

(56) References Cited

U.S. PATENT DOCUMENTS

| | | | | |
|---|---|---|---|---|
| 4,601,825 | A * | 7/1986 | Eriksson | B01D 17/0202 210/287 |
| 5,531,890 | A * | 7/1996 | Keenan | B01D 17/10 210/242.4 |
| 6,407,469 | B1 * | 6/2002 | Cline | A61H 33/005 307/11 |
| 8,574,417 | B2 * | 11/2013 | Eriksen | B01D 17/0211 204/555 |
| 2002/0166797 | A1 | 11/2002 | Banerjee | |
| 2004/0094461 | A1 * | 5/2004 | Sharpless | C02F 1/285 210/163 |
| 2006/0049085 | A1 * | 3/2006 | Parker | E03F 1/00 210/163 |
| 2006/0186050 | A1 * | 8/2006 | Hanes, Jr. | B01D 15/00 210/670 |
| 2007/0129259 | A1 | 6/2007 | Abney et al. | |
| 2012/0211425 | A1 | 8/2012 | Gannon | |
| 2012/0325734 | A1 | 12/2012 | Gannon | |
| 2015/0048033 | A1 | 2/2015 | Burns et al. | |

FOREIGN PATENT DOCUMENTS

| | | |
|---|---|---|
| JP | 06007775 A * | 1/1994 |
| WO | 2014173672 A1 | 10/2014 |

OTHER PUBLICATIONS

Halliburton, Baroid Fluid Services, Barasorb Service, Onsite Screening and Treatment Services to Help Achieve NPDES Permit Oil and Grease Compliance, Apr. 2008, USA.
Halliburton, Barasorb, Material Safety Data Sheet, Jan. 3, 2013.
The International Tanker Owners Pollution Federation Limited, Use of Sorbent Materials in Oil Spill Response, TIP 08, May 19, 2014, UK.
International Search Report and Written Opinion; PCT Application No. PCT/US2015/029640 ; dated Feb. 12, 2016.

* cited by examiner

HYDROCARBON-CONTAMINATION TREATMENT UNIT

CROSS-REFERENCE TO RELATED APPLICATIONS

This application is a national stage entry of PCT/US2015/029640 filed May 7, 2015, said application is expressly incorporated herein in its entirety.

FIELD

The present disclosure relates generally to hydrocarbon contamination treatment units. In particular, the subject matter herein generally relates to decontamination of a hydrocarbon contaminated liquid using a hydrocarbon-absorbent material.

BACKGROUND

During various phases of oil and gas operations it becomes necessary to decontaminate liquid drawn from a wellbore. When a well is drilled, common practice is to displace the well with a completion fluid to insure the wellbore is not contaminated. However, after extended use of the completion fluids, the fluids themselves can become hydrocarbon contaminated.

Hydrocarbon contamination in brines, completion fluids, frack return water, wash-water, produced water, rig site waste pit water, and other clear fluids used in the drilling and completion processes can disrupt the continued use of the liquid. Strict laws are in place regulating the maximum allowable level of hydrocarbon contamination of these fluids. If a completion fluid has more than one percent contamination, the fluid must be either taken out of use or decontaminated.

A standard decontamination process uses cartridge filters which remove hydrocarbons from pass-through fluids. An alternative standard decontamination process uses a diatomaceous earth (DE) filter press. DE filter presses are very large and have a high operating expense. For these reasons, they cannot always be used on small oil rigs or to decontaminate inexpensive fluids. Thus, contaminated completion fluids must be shipped to a disposal or decontamination site, or diluted to a contamination level of under one percent. Such difficulties can lead to longer servicing time and increased costs.

BRIEF DESCRIPTION OF THE DRAWINGS

Implementations of the present technology will now be described, by way of example only, with reference to the attached figures, wherein.

DETAILED DESCRIPTION

Figure 1:
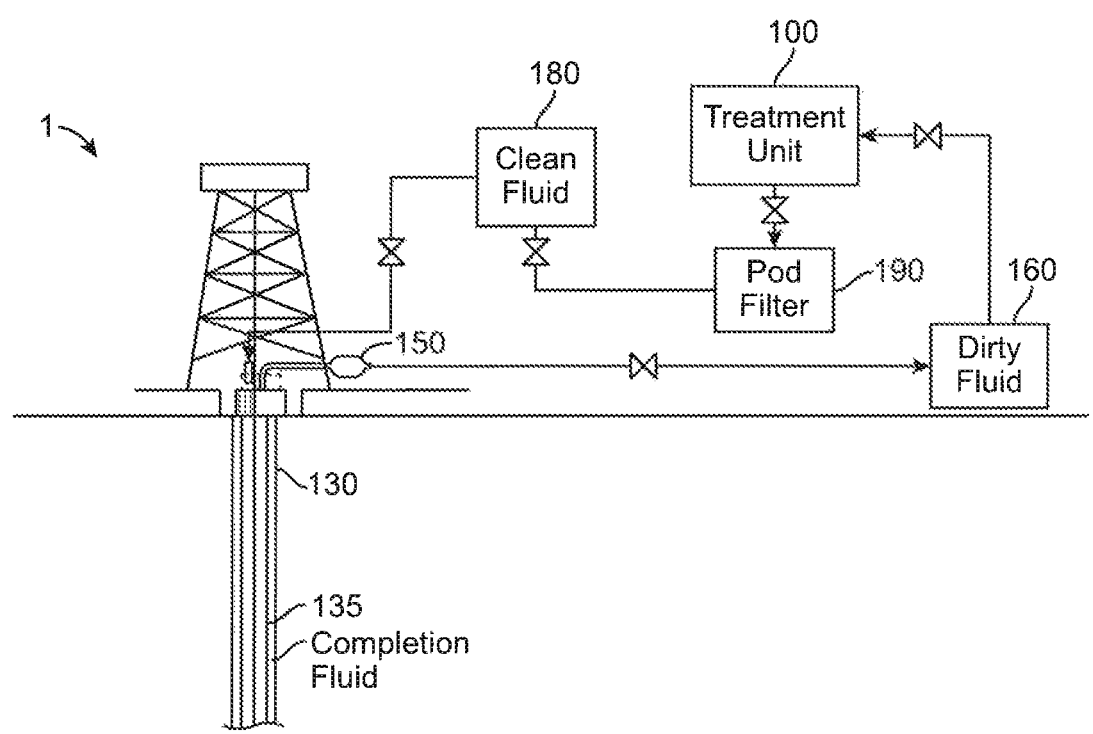
FIG. 1 is a diagram illustrating an exemplary system using a treatment unit according to the disclosure herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The terms "comprising," "including" and "having" are used interchangeably in this disclosure. The terms "comprising," "including" and "having" mean to include, but not necessarily be limited to, the things so described.

In the following description, terms such as "completion fluids" shall mean low solid, clear brines with specifically selected properties. Completion fluids are used in the process of cleaning a well. Mud is removed from the wellbore and replaced with clear completion fluids so that the system is not contaminated.

Disclosed herein is a standalone treatment unit and a process for decontaminating hydrocarbon contaminated liquid using a hydrocarbon-absorbent material. The treatment unit disclosed herein can be used on a rig, and the liquid to be treated can come from a source tank or from a wellbore.

The treatment unit can be employed in an exemplary wellbore system 1 shown, for example, in FIG. 1. A system 1 for cleaning hydrocarbon contaminated liquid includes a wellbore 130, a dirty fluid tank, or source tank 160, a treatment unit 100, a pod filter 190, and a clean fluid tank, or receiving vessel 180. It should be noted that while FIG. 1 generally depicts a land-based operation, those skilled in the art will readily recognize that the principles described herein are equally applicable to operations that employ floating or sea-based platforms and rigs, without departing from the scope of the disclosure.

Disposed within the wellbore 130 is a pipe 135 transporting completion fluids from the wellbore 130 to the surface. A pump 150 is provided which pumps the contaminated completion fluid into source tank 160. The contaminated fluids are then pumped into treatment unit 100 for decontamination. After decontamination, the fluid is pumped to pod filter 190 for further filtration. The clean fluid is then pumped into receiving vessel 180, where it can be pumped directly back into wellbore 130. Although a completion fluid is employed as the example in FIG. 1, it will be understood that any fluid can be treated for hydrocarbon contamination, for example, any fluid to be pumped in or out of the wellbore, including completion fluids, brines, salt water, sea water, fresh water, fracturing fluids, wash water, produced water, rig site waste pit water, clear fluids, or water with organic or inorganic additives, or other fluids and wellbore fluids.

Figure 2:
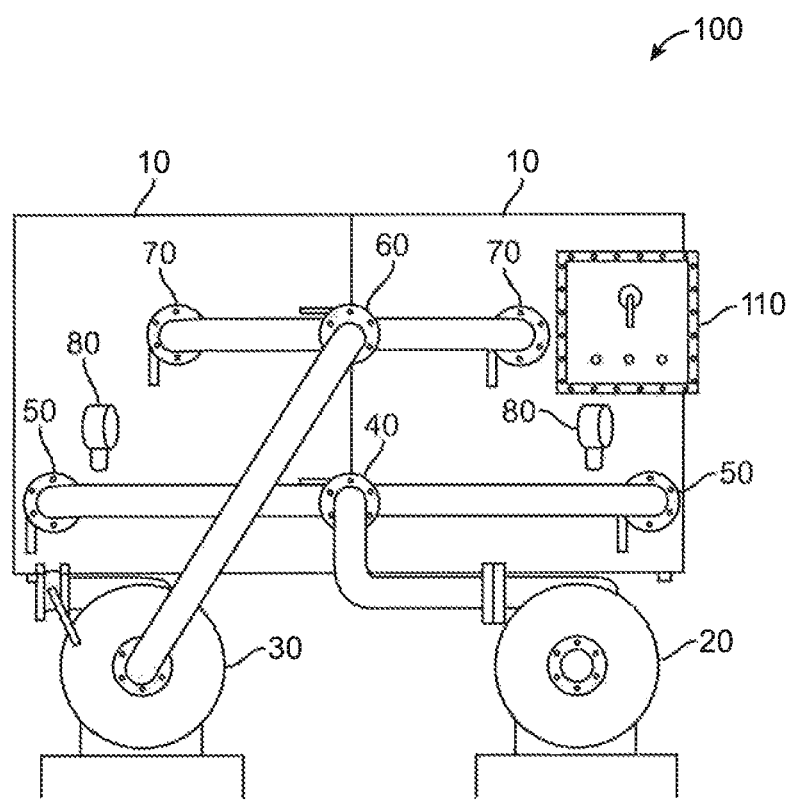
FIG. 2. is a diagram illustrating an exemplary treatment unit.

Illustrated in FIG. 2 is one example of the treatment unit 100. As shown in FIG. 2, the treatment unit 100 can have two treatment tanks 10, an intake pump 20, and an output pump 30. The intake pump 20 and the output pump 30 can be, for example, centripetal pumps, which may be four inch by three inch centrifugal pumps. The relative size and strength of the pump is not limited and can be varied depending on the fluids used or desired flowrates and pressures.

Further shown is an inlet valve 40 and a discharge valve 60, which can be controlled by an electrical control panel 110 to adjust flow of a liquid into the treatment tanks 10. Each treatment tank 10 also has an inlet switching valve 50 coupled to the treatment tank 10, which allows for the flow to be diverted from a first treatment tank 10 to an alternate treatment tank 10. The inlet switching valve 50, as well as other switching valves disclosed herein, can be actuated by levers, electrical controls, or any mechanical and/or electrical means. The inlet switching valves 50 are located at the lower end of the treatment tanks 10 so that fluid entering the treatment unit 100 rises from the base of the treatment tank 10. The fluid pumped into the treatment unit 100 can be pumped from a source tank 160. Alternatively, the fluid pumped into the treatment unit 100 can be pumped either directly from a wellbore 130 or from a filter pod unit.

Further shown in FIG. 2 are two outlet switching valves 70. Each treatment tank 10 has an outlet switching valve 70 coupled to the treatment unit 100 near the top of the treatment tanks 10, the valves can regulate whether the fluid from the treatment tank 10 will be pumped into a receiving vessel 180. The valves used in accordance with the above description can be 4 inch schedule 40 butterfly valves.

Figure 3:
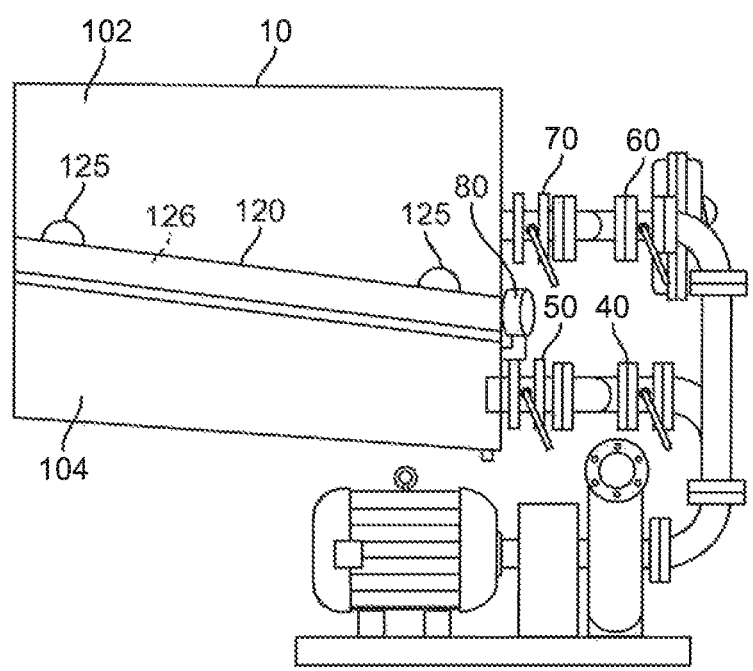
FIG. 3 is a is a partial cross-sectional diagram of an exemplary treatment unit.

A cross-sectional view of the treatment unit 100 is shown in FIG. 3. In particular, treatment basket 120 is shown in FIG. 3. The treatment basket 120 can be removably attached to the treatment tank 10. In this example, the treatment basket 120 has handles 125 on top and defines a cavity 126 capable of containing absorbent material. The cavity 126 of the treatment basket 120 can be between three inches to six inches in depth. The cavity 126 can have screens on the upper and lower sides of the cavity to form a screen box such that a hydrocarbon contaminated fluid can pass upward through the treatment basket 120 and come into contact with the material while the material is contained within the screen box. The screen mesh can be of varying size depending, for example, on the size of the absorbent material within the treatment basket 120. For example, the screen can be between a forty mesh and an eighty mesh screen.

The absorbent material contained in the treatment basket 120 can be any hydrocarbon-absorbing material. For example, the hydrocarbon-absorbent material can be one of cellulosic granular material, woven melt-blown polypropylene, wool, animal hair, human hair, and mixtures thereof. A particular example of a hydrocarbon-absorbent material is BARASORB® brand of cellulosic granular material sold by Halliburton Energy Services, Inc. The treatment baskets 120 can further include handles 125 coupled to the perimeter of the baskets provided for easy removal, and a locking hasp at one end of the treatment baskets 120 to ensure the material is effectively contained within the baskets.

As shown in FIG. 3, the treatment basket 120 is located above the inlet valve 40 and below the discharge valve 60, so that a contaminated fluid pumped into the treatment unit 100 passes through the treatment basket 120 before being pumped out through the discharge valve 60. The treatment basket 120 is arranged at an angle relative to the surface plane of the hydrocarbon-contaminated liquid, allowing the liquid to pass through a lower end of the treatment basket 120. As the fluid rises the pressure in the screen box also increases as the hydrocarbon-absorbent material becomes compressed. The angle at which the treatment box is coupled to the treatment tank allows for a gradual pressure increase across the treatment basket 120 such that differential pressure sensor 80 can determine when the hydrocarbon-absorbent material is contaminated. The differential pressure sensor can be a pressure gauge located on the outside of the treatment tank 10, and the pressure range of the gauge can range for example from 0 psi to 75 psi. The pressure sensor 80 can be positioned to measure the pressure in the lower portion 104 of the treatment tank 10 below the treatment basket 120. The rise in pressure in the lower portion 104 corresponds to the pressure at the treatment basket 120. As the hydrocarbon-absorbent material becomes contaminated, there is a pressure buildup in the fluid below the screen 120. The building of pressure as indicated by the pressure sensor 80 beyond a predefined level indicates contamination of the hydrocarbon-absorbent material beyond a desirable amount and therefore should be replaced.

Figure 4:
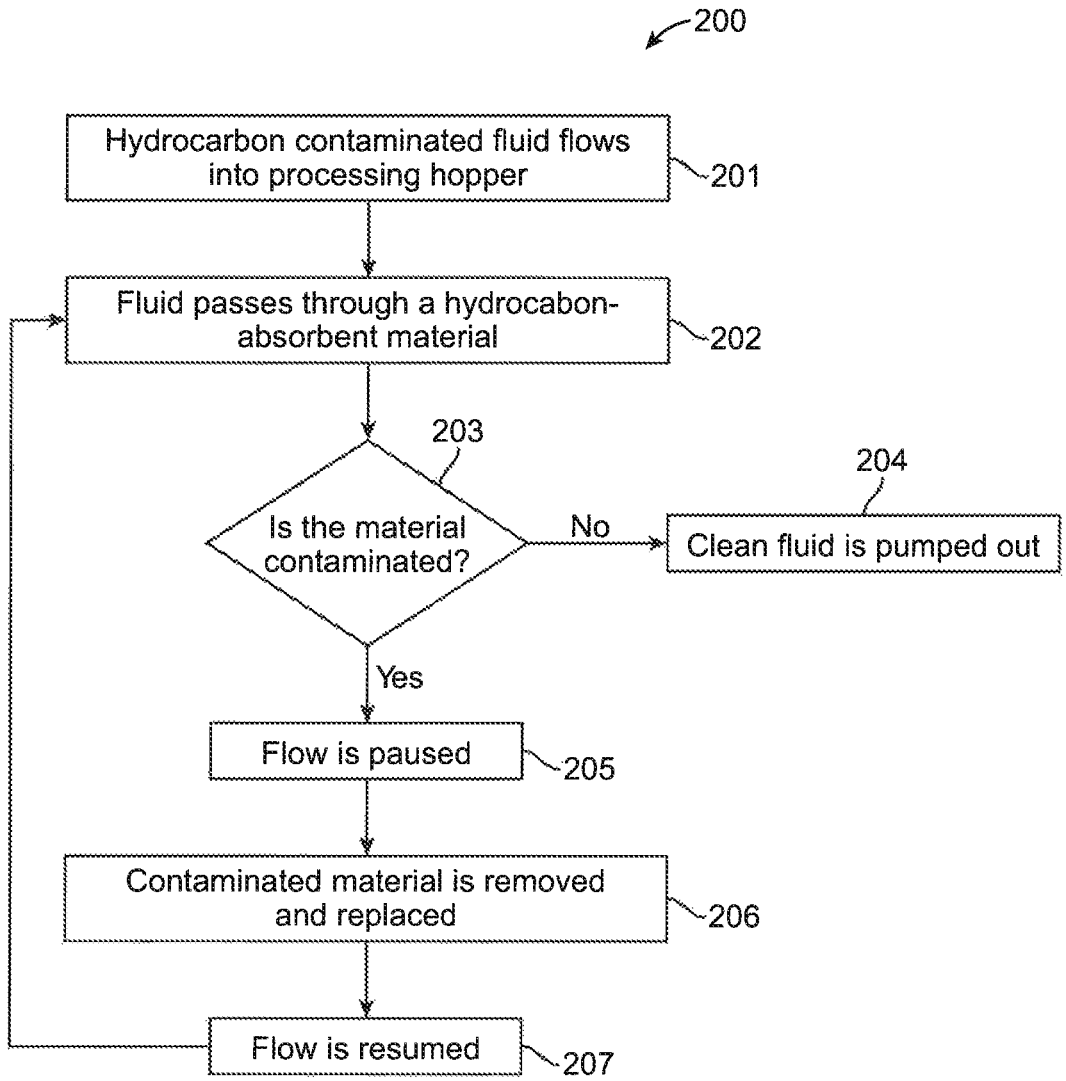
FIG. 4 is a flow diagram of an exemplary decontamination process using the treatment unit according to the present disclosure.

Decontamination of hydrocarbon contaminated fluid through the treatment unit 100 can follow the flow diagram 200 depicted in FIG. 4. For example, beginning at block 201, a hydrocarbon contaminated fluid can be pumped from a source tank 160 through an intake pump 20 into a treatment tank 10. Alternatively, the hydrocarbon contaminated fluid can be pumped directly from a wellbore 130 into the treatment tank 10. In block 202, the contaminated fluid passes through the treatment basket 120 containing a hydrocarbon-absorbent material. As shown in block 203, the contamination level of the hydrocarbon-absorbent material is determined. For example, the contamination level may be determined by the differential pressure sensor 80, which could be mounted within or on the side of the treatment tank 10, or the differential pressure sensor 80 could be fluidically coupled to the treatment tank 10. If the pressure difference is below a predefined level the material is not yet contaminated and the decontaminated fluid is pumped out to a receiving vessel, as shown in block 204. In the provided example, the decontaminated fluid can be pumped directly into the wellbore 130. Alternatively, fluids with higher levels of hydrocarbon contamination can be pretreated using the decontamination process prior to other remediation, for example, electrocoagulation (e.g. Clean Wave®, by Halliburton Energy Services, Inc.). The decontamination process can occur, for example, at a rate of two to six barrels per minute, depending on the fluid. In some examples, the hydrocarbon concentration of the fluid entering the treatment unit 100 can be greater than 1%, alternatively greater than 5%, or alternatively greater than 10% of the fluid by volume, or have a maximum hydrocarbon concentration of 10%. After treatment, the exiting fluid can have a hydrocarbon concentration of less than 1% by volume, or alternatively have decreased by 1-10% by volume.

When the pressure difference exceeds a predefined level the hydrocarbon-absorbent material can be considered contaminated. As shown in block 205, the flow of hydrocarbon-contaminated material is stopped, or alternatively slowed to an undesirable or uneconomical level. At block 206 the treatment basket 120 is removed from the treatment tank 10. The contaminated material is removed from the cavity of the treatment basket 120 and is replaced with new hydrocarbon-absorbent material. The treatment basket 120 is then placed back in the treatment tank 10 and, as shown in block 207, flow is resumed.

Alternatively, the treatment unit 100 can have more than one treatment tank 10. If multiple treatment tanks 10 are present, then the inlet flow of hydrocarbon-contaminated liquid can be diverted from a first treatment tank to an alternate treatment tank, allowing the contaminated hydrocarbon-absorbent material of the first treatment tank to be removed and replaced without stopping operation of the treatment unit 100. Alternatively, the treatment unit 100 can have more treatment baskets 120 than treatment tanks 10, such that when one treatment basket 120 is contaminated it can be replaced in a significantly shorter period of time and allow the treatment tank 10 to resume function while the contaminated hydrocarbon-absorbent material is removed and replaced.

For example, as shown in FIG. 2, the treatment unit 100 has two treatment tanks 10, and the inlet switching valves 50 direct the inflow of contaminated fluid from the intake pump 20 to a selected one of the two treatment tanks, and the outlet switching valves 70 direct the outflow of decontaminated fluid from the selected one of the two treatment tanks to the outlet pump 30. The electrical control panel 110 may include manually operated switches or automatic control logic such as a microprocessor executing a control program of instructions in a non-transitory data storage medium such as a read-only memory to operate electric actuators of the inlet and outlet switching valves 50, 70 and operate electric motors of the pumps 20, 30 in accordance with a processing cycle. For example, the control panel can turn the inlet pump 20 on and off, and can turn the outlet pump 30 on and off, and can operate the switching valves 50, 70, and can perform an emergency stop of all of the electric actuators and motors. The control panel may also provide 110 volt electrical circuits for night lighting.

For example, the processing cycle can include a sequence of the following operations. First, the inlet pump 20 is started and draws contaminated fluid from a source tank. Second, the contaminated fluid from the inlet pump 20 is directed by the inlet switching valves 50 to either the left or right treatment tank 10. Third, the contaminated fluid fills a lower portion 104 of the selected treatment tank 10 and rises toward the treatment basket 120 of hydrocarbon absorbent material. Pressure from the inlet pump 20 forces fluid through the absorbent material in the treatment basket 120, removing associated hydrocarbons. Then the decontaminated fluid fills the upper portion 102 of the treatment tank 10 to a level above the outlet switching valve 70, and the outlet switching valve 70 directs the decontaminated fluid to the outlet pump 30.

Fourth, as the decontaminated fluid fills the outlet piping from the outlet switching valve 70 to the outlet pump 30, the outlet pump 30 is turned on, pumping the decontaminated fluid. The decontaminated fluid is pumped by the outlet pump 30 to a receiving vessel 180. Fifth, as the processing proceeds, the hydrocarbon absorbent material becomes saturated with hydrocarbon from the contaminated fluid, beginning with the absorbent that is lowest in the treatment tank 10. A rise in differential pressure across the treatment basket 120 indicates when treatment effectiveness is diminished to such an extent that the inlet switching valves 50 should switch the inflow of the contaminated fluid over to the other treatment tank 10.

Sixth, the switchover can done on the fly, without stopping the inlet pump 20, in order to avoid or reduce downtime of the unit 100. The inlet switching valves 50 are switched first, so that the outlet pump 30 continues to draw from the treatment tank with the saturated hydrocarbon absorbent material until the fluid level in this treatment tank falls below the outlet piping of the outlet switching valve 70. Then the outlet switching valves 70 are switched over to the other treatment tank 10, and the outlet pump 30 may continue to run to then pump decontaminated fluid from the other treatment tank.

Seventh, the treatment basket of contaminated absorbent material is removed from the newly offline treatment tank 10, and the contaminated absorbent material is paced in a disposal container. Fresh absorbent material is placed into the treatment basket 120, and the treatment basket 120 is placed in the treatment tank 10. This seventh operation can be accelerated by using a third treatment basket 120, which would be pre-loaded with fresh absorbent material so that the third treatment basket 120 could be placed into the treatment tank as soon as the basket of contaminated absorbent material is removed from the newly offline treatment tank. After the seventh operation, the change-over process is repeated as required, until no contaminated fluid remains.

Alternatively, the treatment unit can be used in conjunction with other oil well fluid, Fracking, and Production services. For example, the treatment unit can be used as a downstream component of a dewatering process of well bore fluid. Alternatively, the treatment unit can be used as an upstream component of a sludge unit where hydrocarbon contamination is introduced into the process facility run off or drainage water at stock points and mixing facilities.

Figure 5:
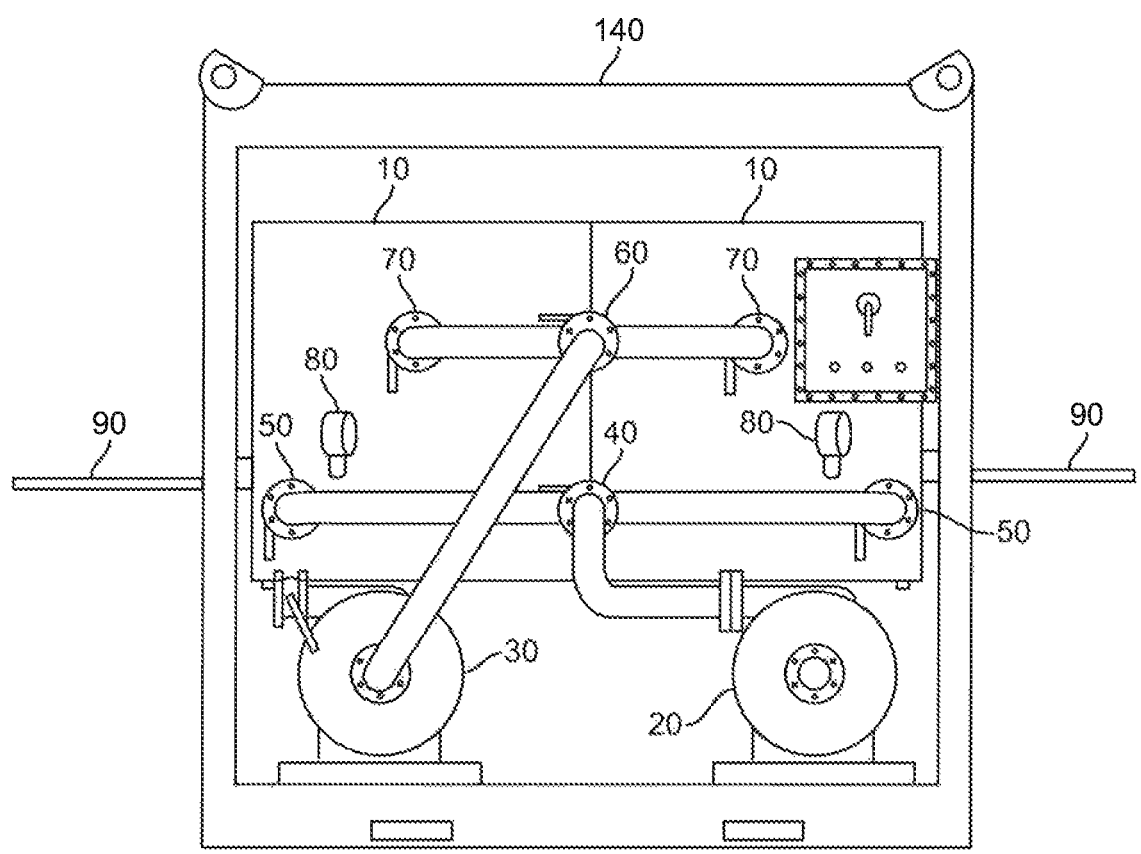
FIG. 5 is a diagram illustrating an exemplary DNV skid surrounding a treatment unit.
Figure 6:
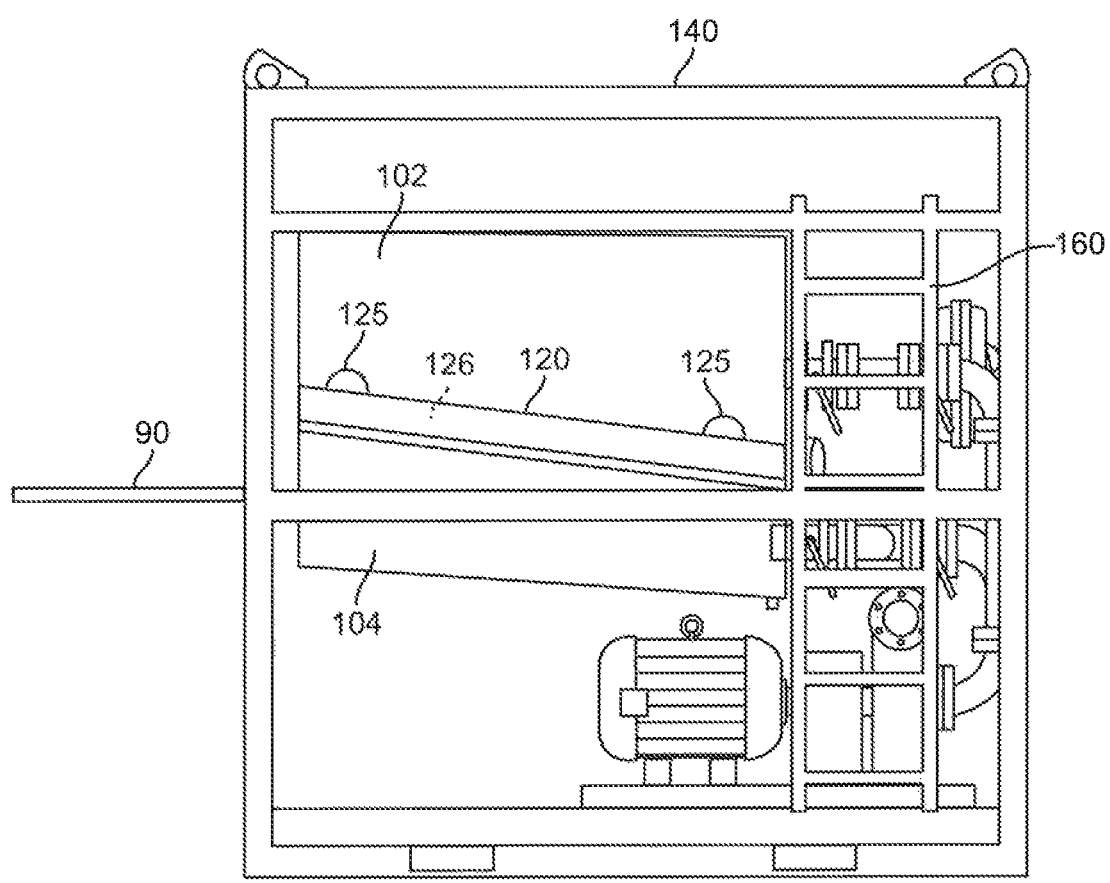
FIG. 6 is a partial cross-sectional diagram of an exemplary DNV skid.

FIG. 5 illustrates a protective Det Norske Veritas (DNV) skid 140 surrounding the treatment unit 100. The DNV skid 140 can be, for example, an 8'×8'×8' DNV certified, protective skid. The DNV skid 140 can have one or more walkways 90. For example, a walkway can be located across the front of the treatment unit 100 allowing access to valves and controls. The walkways can be located anywhere between three to five feet off the ground. In particular examples, these can be less than four feet off the ground. It should be noted that additional safety precautions, such as handrails, may be required depending on the height of the walkways and relative size of the treatment unit 100 and DNV skid 140. The walkways 90 can be coupled to the DNV skid 140 such that they can be folded up for shipping. As shown in FIG. 6, the DNV skid 140 can also have a ladder 160 to provide access to various parts of the treatment unit 100 including the foldable walkways 90. The DNV skid 140 can further include brackets (not shown) coupled to the top horizontal members of the DNV skid 140 such that light kits can be coupled to the DNV skid 140 for night operations.

Numerous examples are provided herein to enhance understanding of the present disclosure. A specific set of examples are provided as follows.

In a first example, there is disclosed a treatment unit including at least one treatment tank; an intake pump in fluidic communication with the at least one treatment tank via an inlet valve; an output pump in fluidic communication with the at least one treatment tank via a discharge valve; at least one treatment basket defines a cavity, wherein the at least one treatment basket is removably attached to the at least one treatment tank, wherein the at least one treatment basket is located above the inlet valve and below the discharge valve; an electrical control panel configured to operate at least one of the intake pump, the inlet valve, the output pump, and the discharge valve; and a differential pressure sensor sensing a pressure difference across the at least one treatment basket.

In a second example, a method is disclosed according to the preceding example, wherein a hydrocarbon-absorbent material is received in the cavity of the at least one treatment basket.

In a third example, a method is disclosed according to any of the preceding examples, wherein the hydrocarbon-absorbent material is selected from the group consisting of cellulosic granular material, woven melt-blown polypropylene, wool, animal hair, human hair, and mixtures thereof.

In a fourth example, a method is disclosed according to any of the preceding examples, wherein the at least one treatment basket further comprises at least one screen permitting flow of a hydrocarbon-contaminated liquid therethrough to contact the hydrocarbon-absorbent material.

In a fifth example, a method is disclosed according to any of the preceding examples, wherein the treatment basket is arranged at an angle relative to the surface plane of the hydrocarbon-contaminated liquid when contained in the at least one treatment tank.

In a sixth example, a method is disclosed according to any of the preceding examples, wherein at least one inlet switching valve for switching an inlet flow of a hydrocarbon-contaminated liquid from on treatment tank to another treatment tank; and at least one outlet switching valve for switching a discharge flow of a decontaminated liquid from one treatment tank to another treatment tank.

In a seventh example, there is disclosed a process for cleaning a hydrocarbon-contaminated liquid comprising pumping the hydrocarbon-contaminated liquid through an intake pump to at least one treatment tank via an inlet located at the lower end of the treatment tank; passing the hydrocarbon-contaminated liquid through at least one treatment basket as the level of hydrocarbon-contaminated liquid in the treatment tank rises, wherein the at least one treatment basket contains a hydrocarbon-absorbent material; and pumping the filtered liquid out through a discharge valve located at the top of the at least one treatment tank and through an output pump.

In an eighth example, a method is disclosed according to the seventh example, wherein the hydrocarbon-absorbent material is selected from the group consisting of cellulosic granular material, woven melt-blown polypropylene, wool, animal hair, human hair, and mixtures thereof.

In a ninth example, a method is disclosed according to the seventh or eighth examples, wherein the hydrocarbon-contaminated liquid pumped through the intake pump has a hydrocarbon-contamination level greater than one percent.

In a tenth example, a method is disclosed according to the seventh to the ninth examples, wherein the filtered liquid pumped through the output pump has a hydrocarbon-contamination level less than one percent.

In an eleventh example, a method is disclosed according to the seventh to the tenth examples, wherein the hydrocarbon-contaminated liquid pumped through the intake pump is drawn from a wellbore.

In a twelfth example, a method is disclosed according to the seventh to the eleventh examples, wherein the treatment basket is arranged at an angle relative the surface plane of the hydrocarbon-contaminated liquid when contained in the at least one treatment tank.

In a thirteenth example, a method is disclosed according to the seventh to the twelfth examples, wherein the at least one treatment basket further comprises at least one screen permitting flow of a hydrocarbon-contaminated liquid therethrough to contact the hydrocarbon-absorbent material.

In a fourteenth example, a method is disclosed according to the seventh to the thirteenth examples, wherein the treatment unit further comprises at least one inlet switching valve for switching an inlet flow of the hydrocarbon-contaminated liquid from one treatment tank to another treatment tank; and at least one outlet switching valve for switching a discharge flow of a decontaminated liquid from one treatment tank to another treatment tank.

In a fifteenth example, a method is disclosed according to the seventh to the fourteenth examples, wherein a pressure difference is measured across the at least one treatment basket.

In a sixteenth example, a method is disclosed according to the seventh to the fifteenth examples, wherein the at least one treatment basket is removed from the at least one treatment tank when the pressure difference increases above a predetermined level; the contaminated hydrocarbon-absorbent material is removed from the at least one treatment basket; the at least one treatment basket is refilled with uncontaminated hydrocarbon-absorbent material; and the at least one treatment basket is replaced into the at least one treatment tank.

In a seventeenth example, there is disclosed a system comprising a wellbore; a source tank receiving a hydrocarbon contaminated liquid from the wellbore; a treatment unit in fluidic communication with the source tank, the treatment unit comprising: at least one treatment tank; an intake pump, wherein an inlet end of the intake pump is in fluidic communication with the source tank, and an output end of the intake pump is in fluidic communication with at least one treatment tank via an inlet valve; an output pump, wherein an inlet end of the output pump is in fluidic communication with the at least one treatment tank via a discharge valve; at least one treatment basket defines a cavity, wherein the at least one treatment basket is removably attached to the at least one treatment tank, wherein the at least one treatment basket is located above the inlet valve and below the discharge valve; an electrical control panel configured to operate at least one of the intake pump, the inlet valve, the output pump, and the discharge valve; and a differential pressure sensor sensing the pressure difference across the at least one treatment basket; wherein a hydrocarbon-absorbent material is received in the cavity of the at least one treatment basket; and a receiving vessel in fluidic communication with an output end of the output pump of the treatment unit.

In an eighteenth example, a method is disclosed according to the seventeenth example, wherein the hydrocarbon-absorbent material is selected from the group consisting of cellulosic granular material, woven melt-blown polypropylene, wool, animal hair, human hair, and mixtures thereof.

In a nineteenth example, a method is disclosed according to the seventeenth to the eighteenth examples, wherein the treatment basket is arranged at an angle relative the surface plane of the hydrocarbon-contaminated liquid when contained in the at least one treatment tank.

In twentieth example, a method is disclosed according to the seventeenth to the nineteenth examples, wherein the treatment unit further comprises at least one switching valve for switching an inlet flow of hydrocarbon-contaminated liquid from one treatment tank to another treatment tank; and at least one outlet switching valve for switching a discharge flow of a decontaminated liquid from one treatment tank to another processing hoper.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A treatment unit comprising:
   at least one treatment tank having an upper portion and a lower portion;
   an intake pump in fluidic communication with the at least one treatment tank via an inlet valve located in the lower portion of the at least one treatment tank;
   an output pump in fluidic communication with the at least one treatment tank via a discharge valve located in the upper portion of the at least one treatment tank;
   at least one treatment basket defining a cavity permitting flow of a hydrocarbon-contaminated completion fluid therethrough, the at least one treatment basket removably attached to the at least one treatment tank, wherein the at least one treatment basket is located above the inlet valve and below the discharge valve and arranged at an angle relative to the surface plane of the hydrocarbon-contaminated completion fluid when contained in the at least one treatment tank, wherein the at least one treatment basket contains a hydrocarbon-absorbent material;
   an electrical control panel configured to operate at least one of the intake pump, the inlet valve, the output pump, and the discharge valve; and
   a differential pressure sensor sensing a pressure increase in the lower portion of the at least one treatment tank, the pressure increase indicative of a reduction in the effectiveness of the hydrocarbon-absorbent material.

2. The treatment unit as claimed in claim 1, wherein the hydrocarbon-absorbent material is received in the cavity of the at least one treatment basket and wherein the hydrocarbon-contaminated completion fluid is contacted by the hydrocarbon-absorbent material.

3. The treatment unit as claimed in claim 2, wherein the hydrocarbon-absorbent material is selected from the group consisting of cellulosic granular material, woven melt-blown polypropylene, wool, animal hair, human hair, and mixtures thereof.

4. The treatment unit as claimed in claim 2, wherein the at least one treatment basket further comprises at least one screen disposed therein and permitting the hydrocarbon-contaminated completion fluid to contact the hydrocarbon-absorbent material.

5. The treatment unit as claimed in claim 1, further comprising:
   at least one inlet switching valve for switching an inlet flow of the hydrocarbon-contaminated completion fluid from one treatment tank to a second treatment tank; and
   at least one outlet switching valve for switching a discharge flow of a decontaminated liquid from one treatment tank to a second treatment tank.

6. A process for cleaning a hydrocarbon-contaminated liquid comprising:
   pumping a hydrocarbon-contaminated completion fluid through a treatment unit via an intake pump into at least one treatment tank of the treatment unit via an inlet valve located at a lower portion of the at least one treatment tank;
   passing the hydrocarbon-contaminated completion fluid through at least one treatment basket disposed within the at least one treatment tank as the level of hydrocarbon-contaminated completion fluid in the treatment tank rises, wherein the at least one treatment basket contains a hydrocarbon-absorbent material, and wherein the treatment basket is arranged at an angle relative the surface plane of the hydrocarbon-contaminated completion fluid when contained in the at least one treatment tank;
   pumping a decontaminated liquid out of the treatment unit through a discharge valve located at the top of the at least one treatment tank and through an output pump;
   measuring a pressure increase in the lower portion of the at least one treatment basket, the pressure increase indicative of a reduction in the effectiveness of the hydrocarbon-absorbent material; and
   removing the at least one treatment basket from the at least one treatment tank when the pressure increase exceeds a predetermined level.

7. The process as claimed in claim 6, wherein the hydrocarbon-absorbent material is selected from the group consisting of cellulosic granular material, woven melt-blown polypropylene, wool, animal hair, human hair, and mixtures thereof.

8. The process as claimed in claim 6, wherein the hydrocarbon-contaminated completion fluid pumped through the intake pump has a hydrocarbon-contamination level greater than one percent.

9. The process as claimed in claim 6, wherein the decontaminated liquid pumped through the output pump has a hydrocarbon-contamination level less than one percent.

10. The process as claimed in claim 6, wherein the hydrocarbon-contaminated completion fluid pumped through the intake pump is drawn from a wellbore.

11. The process as claimed in claim 6, wherein the at least one treatment basket further comprises at least one screen permitting flow of hydrocarbon-contaminated completion fluid therethrough to contact the hydrocarbon-absorbent material.

12. The process as claimed in claim 6, wherein the treatment unit further comprises:
    at least one inlet switching valve for switching an inlet flow of the hydrocarbon-contaminated contaminated fluid from one treatment tank to a second treatment tank; and
    at least one outlet switching valve for switching a discharge flow of the decontaminated liquid from one treatment tank to a second treatment tank.

13. The process as claimed in claim 6, further comprising:
    removing the contaminated hydrocarbon-absorbent material from the at least one removed treatment basket when the pressure increase exceeds the predetermined level;
    refilling the at least one treatment basket with uncontaminated hydrocarbon-absorbent material; and
    replacing the at least one treatment basket into the at least one treatment tank.

14. A system comprising:
    a wellbore;
    a source tank receiving a hydrocarbon contaminated completion fluid from the wellbore;
    a treatment unit in fluidic communication with the source tank, the treatment unit comprising:
       at least one treatment tank having an upper portion and a lower portion;
       an intake pump, wherein an inlet end of the intake pump is in fluidic communication with the source tank, and an output end of the intake pump is in fluidic communication with the at least one treatment tank via an inlet valve located in the lower portion of the at least one treatment tank;

an output pump, wherein an inlet end of the output pump is in fluidic communication with the at least one treatment tank via a discharge valve located in the upper portion of the at least one treatment tank;

at least one treatment basket defining a cavity, wherein the at least one treatment basket is removably attached to the at least one treatment tank, the at least one treatment basket located above the inlet valve and below the discharge valve and is arranged at an angle relative the surface plane of the hydrocarbon-contaminated completion fluid when contained in the at least one treatment tank;

an electrical control panel configured to operate at least one of the intake pump, the inlet valve, the output pump, and the discharge valve; and a differential pressure sensor sensing a pressure increase in the lower portion of the at least one treatment tank, the pressure increase indicative of a reduction in the effectiveness of the hydrocarbon-absorbent material;

wherein a hydrocarbon-absorbent material is received in the cavity of the at least one treatment basket; and a receiving vessel in fluidic communication with an output end of the output pump of the treatment unit.

15. The system as claimed in claim 14, wherein the hydrocarbon-absorbent material is selected from the group consisting of cellulosic granular material, woven melt-blown polypropylene, wool, animal hair, human hair, and mixtures thereof.

16. The system as claimed in claim 14, further comprising:

at least one inlet switching valve for switching an inlet flow of a hydrocarbon-contaminated completion fluid from one treatment tank to a second treatment tank; and at least one outlet switching valve for switching a discharge flow of a decontaminated liquid from one treatment tank to a second treatment tank.

* * * * *